United States Patent
Clarke et al.

(10) Patent No.: US 8,286,616 B2
(45) Date of Patent: Oct. 16, 2012

(54) CONDENSATION CONTROL SYSTEMS AND METHODS

(75) Inventors: David Clarke, Worthing (GB); Anthony Truscott, Worthing (GB); Radek Motal, Prague (CZ)

(73) Assignee: GM Global Technology Operations LLC

( * ) Notice: Subject to any disclaimer, the term of this patent is extended or adjusted under 35 U.S.C. 154(b) by 384 days.

(21) Appl. No.: 12/612,223

(22) Filed: Nov. 4, 2009

(65) Prior Publication Data

US 2010/0326408 A1    Dec. 30, 2010

Related U.S. Application Data

(60) Provisional application No. 61/221,256, filed on Jun. 29, 2009.

(51) Int. Cl.
    *F02M 25/07*    (2006.01)
    *F02B 47/08*    (2006.01)
    *F02D 41/00*    (2006.01)

(52) U.S. Cl. .................. 123/568.21; 701/108

(58) Field of Classification Search ........... 123/568.11, 123/586.12, 568.21, 568.22, 568.24, 568.26; 701/108
    See application file for complete search history.

(56) References Cited

U.S. PATENT DOCUMENTS

| | | | | |
|---|---|---|---|---|
| 6,899,090 | B2* | 5/2005 | Arnold | 123/568.12 |
| 7,007,680 | B2* | 3/2006 | Tussing et al. | 123/568.12 |
| 7,469,691 | B2* | 12/2008 | Joergl et al. | 123/568.12 |
| 7,469,692 | B2* | 12/2008 | Dea et al. | 123/568.21 |
| 7,715,976 | B1* | 5/2010 | Xiao et al. | 701/108 |
| 2002/0053343 | A1* | 5/2002 | Sato et al. | 123/568.16 |
| 2003/0114978 | A1* | 6/2003 | Rimnac et al. | 701/108 |
| 2003/0192516 | A1* | 10/2003 | Brunemann et al. | 123/568.12 |
| 2005/0021218 | A1* | 1/2005 | Bhargava et al. | 701/108 |
| 2009/0132153 | A1* | 5/2009 | Shutty et al. | 701/108 |

FOREIGN PATENT DOCUMENTS

EP    0 991 859 B1    7/2002

OTHER PUBLICATIONS

SAE International, 2000-01-0266, "Coordinated EGR-VGT Control for Diesel Engines: an Experimental Comparison", M.J. van Nieuwstadt, I.V. Kolmanovsky and P.E. Moraal, Copyright © 2000 Society of Automotive Engineers, Inc., 14 pages.

(Continued)

*Primary Examiner* — Stephen K Cronin
*Assistant Examiner* — Arnold Castro

(57) ABSTRACT

A condensation control system for a vehicle comprises a short route (SR) target module, a long-route (LR) target module, and a humidity adjustment module. The SR target module controls a first opening target for opening of a first exhaust gas recirculation (EGR) valve and a first throttle valve based on a SR target and a SR adjustment. The LR target module controls a second opening target for opening of a second EGR valve and a second throttle valve based on a LR target and a LR adjustment. The humidity adjustment module adjusts the SR and LR adjustments based on a humidity adjustment when condensation is detected in a system that provides a gas to an engine for combustion and determines the humidity adjustment based on a difference between a humidity within the system and a predetermined humidity.

20 Claims, 7 Drawing Sheets

OTHER PUBLICATIONS

SAE International, 2001-01-2006, "Study of Model-based Cooperative Control of EGR and VGT for a Low-temperature, Premixed Combustion Diesel Engine", Takashi Shirawaka, Manabu Miura, Hiroyuki Itoyama, Eiji Aiyoshizawa and Shuji Kimura, Copyright © 2001 Society of Automotive Engineers. Inc., 11 pages.

SAE International, 2003-01-0357, "Model-Based Control of the BGT and EGR in a Turbocharged Common-Rail Diesel Engine: Theory and Passenger Car Implementation", M.Ammann and N.P. Fekete, L.Guzzella and A.H. Glattfelder, Reprinted From: Electronic Engine Controls 2003 (SP-1749), Copyright © 2003 SAE International, 14 pages.

U.S. Appl. No. 12/612,192, filed Nov. 4, 2009, Clarke et al.

* cited by examiner

CONDENSATION CONTROL SYSTEMS AND METHODS

CROSS-REFERENCE TO RELATED APPLICATIONS

This application claims the benefit of U.S. Provisional Application No. 61/221,256, filed on Jun. 29, 2009. The disclosure of the above application is incorporated herein by reference in its entirety.

This application is related to U.S. application Ser. No. 12/612,192, filed on Nov. 4, 2009, which claims the benefit of U.S. Provisional Application No. 61/221,234, filed on Jun. 29, 2009. The disclosures of the above applications are incorporated herein by reference in their entirety.

FIELD

The present disclosure relates to internal combustion engines and more specifically condensation control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

SUMMARY

A condensation control system for a vehicle comprises a short route (SR) target module, a long-route (LR) target module, and a humidity adjustment module. The SR target module controls a first opening target for opening of a first exhaust gas recirculation (EGR) valve and a first throttle valve based on a SR target and a SR adjustment. The LR target module controls a second opening target for opening of a second EGR valve and a second valve based on a LR target and a LR adjustment. The humidity adjustment module adjusts the SR and LR adjustments based on a humidity adjustment when condensation is detected in a system that provides a gas to an engine for combustion and determines the humidity adjustment based on a difference between a humidity within the system and a predetermined humidity.

In other features, the condensation control system further comprises a SR control module and a LR control module. The SR control module controls opening of the first EGR valve and the first throttle valve based on the first opening target. The LR control module controls opening of the second EGR valve and the second valve based on the second opening target.

In still other features, the first EGR valve controls exhaust gas flow from an exhaust manifold to an intake manifold, and the second EGR valve controls exhaust gas flow from downstream of a particulate filter to upstream of an inlet of a turbocharger compressor.

In further features, the humidity adjustment module determines the humidity adjustment based on a sum of the difference and a previous humidity adjustment when the condensation is detected.

In still further features, the condensation control system further comprises an SR adjustment module and an LR adjustment module. The SR adjustment module determines the SR adjustment based on a second SR adjustment and the humidity adjustment. The LR adjustment module determines the LR adjustment based on a second LR adjustment and the humidity adjustment.

In other features, the SR adjustment module determines the SR adjustment based on the second SR adjustment less the humidity adjustment, and the LR adjustment module determines the LR adjustment based on a sum of the second LR adjustment and the humidity adjustment.

In still other features, the second SR and LR adjustments are determined based on a speed of the engine and an engine load.

In further features, the humidity adjustment module decreases the first opening target and increases the second opening target based on the humidity adjustment.

In still further features, the humidity adjustment module decreases the SR adjustment and increases the LR adjustment based on the humidity adjustment.

In other features, the second valve includes one of a second throttle valve and a back-pressure valve.

A condensation control method for a vehicle comprises: controlling a first opening target for opening of a first exhaust gas recirculation (EGR) valve and a first throttle valve based on a short route (SR) target and a SR adjustment; controlling a second opening target for opening of a second EGR valve and a second valve based on a long route (LR) target and a LR adjustment; adjusting the SR and LR adjustments based on a humidity adjustment when condensation is detected in a system that provides a gas to an engine for combustion; and determining the humidity adjustment based on a difference between a humidity within the system and a predetermined humidity.

In other features, the condensation control method further comprises controlling opening of the first EGR valve and the first throttle valve based on the first opening target and controlling opening of the second EGR valve and the second valve based on the second opening target.

In still other features, the first EGR valve controls exhaust gas flow from an exhaust manifold to an intake manifold, and the second EGR valve controls exhaust gas flow from downstream of a particulate filter to upstream of an inlet of a turbocharger compressor.

In further features, the condensation control method further comprises determining the humidity adjustment based on a sum of the difference and a previous humidity adjustment when the condensation is detected.

In still further features, the condensation control method further comprises determining the SR adjustment based on a second SR adjustment and the humidity adjustment and determining the LR adjustment based on a second LR adjustment and the humidity adjustment.

In other features, the condensation control method further comprises determining the SR adjustment based on the second SR adjustment less the humidity adjustment and determining the LR adjustment based on a sum of the second LR adjustment and the humidity adjustment.

In still other features, the condensation control method further comprises determining the second SR and LR adjustments further based on a speed of the engine and an engine load.

In further features, the condensation control method further comprises decreasing the first opening target and increasing the second opening target based on the humidity adjustment.

In still further features, the condensation control method further comprises decreasing the SR adjustment and increasing the LR adjustment based on the humidity adjustment.

In other features, the second valve includes one of a second throttle valve and a back-pressure valve.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

Figure 1A:
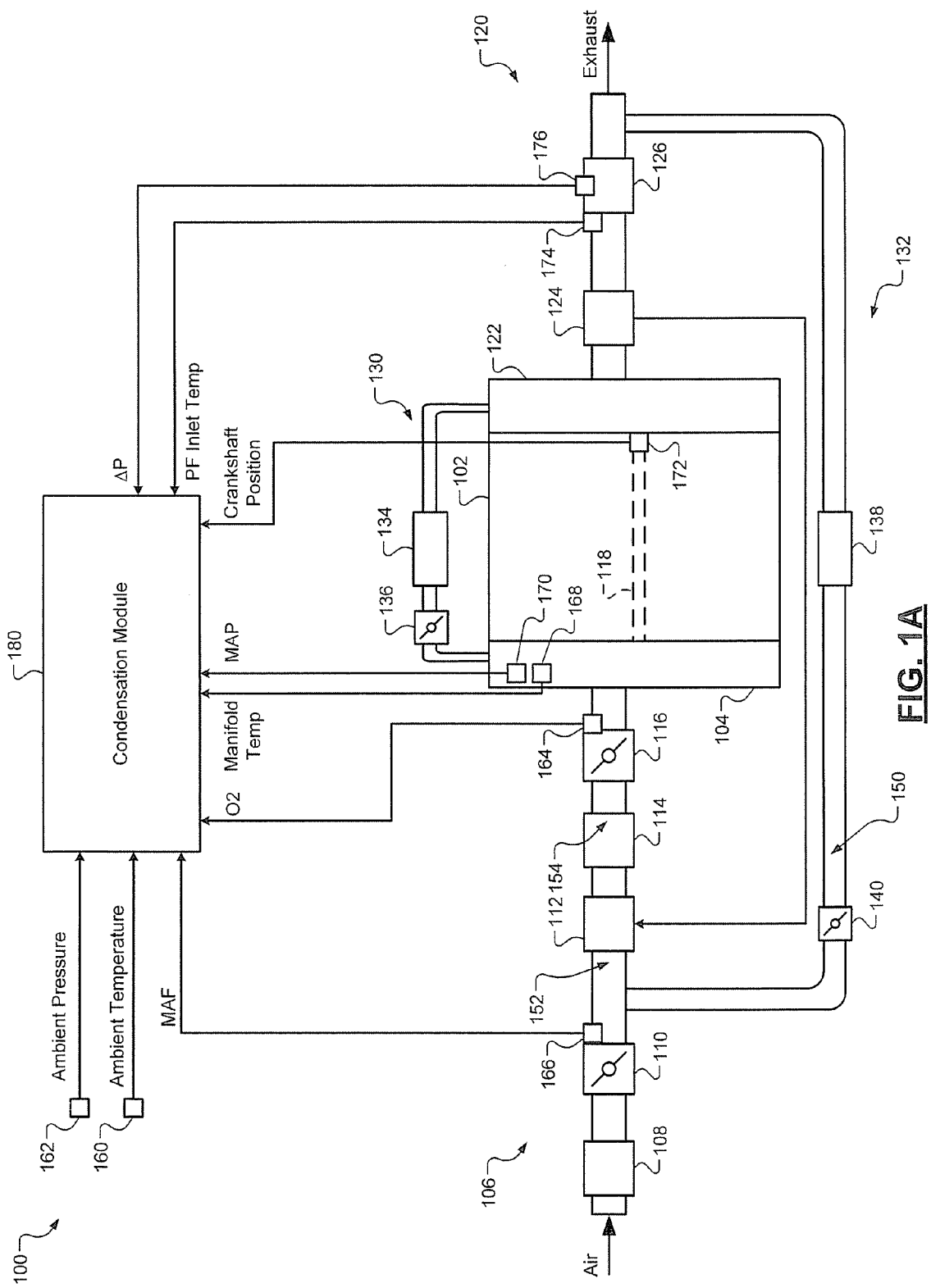
FIGS. 1A-1B are functional block diagrams of exemplary engine systems according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Cooling of a (relatively) warm gas or gas mixture in an engine system may cause condensation. For example, warm exhaust gas recirculated back to an engine may be mixed with cooler air being drawn into the engine. The temperature of the resulting mixture of air and exhaust gas may be below the dew point of the air/exhaust gas mixture. Condensation may therefore be present in the engine system near where the mixing occurs and downstream of that location. Condensation may cause corrosion and/or erosion of components that are contacted by the condensation.

A condensation module controls opening of a first exhaust gas recirculation (EGR) valve and a first throttle valve based on a first target. The condensation module determines the first target based on a short route (SR) target and a SR adjustment. The condensation module also controls opening of a second EGR valve and a second throttle valve based on a second target. The condensation module determines the second target based on a long route (LR) target and a LR adjustment. When condensation is detected in the engine system, the condensation module adjusts the SR and LR adjustments based on a humidity adjustment. Adjusting the SR and LR adjustments based on the humidity adjustment eliminates the detected condensation.

Referring now to FIG. 1A, a functional block diagram of an exemplary engine system 100 is presented. The engine system 100 includes an engine 102 that combusts an air/fuel mixture within one or more cylinders (not shown) to produce drive torque for a vehicle. The engine system 100 may be a diesel engine system or another suitable type of engine system. One or more electric motors (not shown) may also be implemented with the engine system 100. Air is drawn into the engine 102 through an intake manifold 104. More specifically, air is drawn into the intake manifold 104 via an intake system 106.

The intake system 106 includes an air filter 108, a first throttle valve 110, a turbocharger compressor 112, an aftercooler 114, and a second throttle valve 116. While not specifically recited, the intake system 106 also includes connecting devices (e.g., pipes) that connect the components of the intake system 106 together. Air being drawn into the intake manifold 104 may encounter the components of the intake system 106 in the following order: first, the air filter 108; second, the first throttle valve 110; third, the turbocharger compressor 112; fourth, the aftercooler 114; fifth, the second throttle valve 116; and sixth, the intake manifold 104.

Opening of the first throttle valve 110 is regulated to control the flow of air through the first throttle valve 110. The turbocharger compressor 112 receives air and compresses the air. The turbocharger compressor 112 provides a compressed air charge to the aftercooler 114. The compression of the air generates heat. The aftercooler 114 cools the compressed air and provides the cooled compressed air to the second throttle valve 116. Opening of the second throttle valve 116 is regulated to control the flow of the cool compressed air into the intake manifold 104.

Gas from the intake manifold 104 (e.g., air or an air/exhaust gas mixture) is drawn into the one or more cylinders of the engine 102. Fuel is mixed with the air to form an air/fuel mixture. For example only, the fuel may be injected directly into each cylinder of the engine 102. In other engine systems, the fuel may be injected into the intake manifold 104 or another suitable location. Combustion of the air/fuel mixture drives a rotating crankshaft 118, thereby generating torque.

The byproducts of combustion are exhausted from the engine 102 to an exhaust system 120. The exhaust system 120 includes an exhaust manifold 122, a turbocharger impeller 124, and a particulate filter (PF) 126. While not specifically recited, the exhaust system 120 also includes connecting devices (e.g., pipes) that connect the components of the exhaust system 120 together. Exhaust gas traveling through the exhaust system 120 may encounter the components of the exhaust system 120 in the following order: first, the exhaust manifold 122; second, the turbocharger impeller 124; and third, the PF 126.

The flow of the exhaust gas drives rotation of the turbocharger impeller 124. The turbocharger impeller 124 is linked to the turbocharger compressor 112, and the rotation of the turbocharger impeller 124 drives rotation of the turbocharger compressor 112. In some implementations, the turbocharger impeller 124 may include a variable geometry turbocharger (VGT), a variable nozzle turbocharger (VNT), or another suitable type of turbocharger. The PF 126 filters various components of the exhaust gas from the exhaust gas (e.g., soot). For example only, the PF 126 may include a diesel particulate filter (DPF).

The engine system 100 also includes a first exhaust gas recirculation (EGR) system 130 and a second EGR system 132. The first EGR system 130 controls circulation of exhaust gas from the exhaust manifold 122 back to the intake manifold 104. In this manner, the first EGR system 130 provides exhaust gas back to the intake manifold 104 to be re-introduced to the engine 102. Recirculating exhaust gas back to the engine 102 for combustion produces lower combustion temperatures which, in turn, produces exhaust gas having lower concentrations of nitrogen oxides (NOx).

The first EGR system 130 includes a first EGR cooler/cooler bypass 134 and a first EGR valve 136. While not specifically recited, the first EGR system 130 also includes connecting devices (e.g., pipes) that connect the components of the first EGR system 130 together. Exhaust gas flows through the first EGR system 130 to the first EGR cooler/cooler bypass 134.

The first EGR cooler/cooler bypass 134 includes an EGR cooler and a cooler bypass (not shown). The EGR cooler cools exhaust gas flowing through the EGR cooler. The cooler bypass allows exhaust gas to bypass the EGR cooler. Opening of the first EGR valve 136 is regulated to control the flow of the exhaust gas back to the intake manifold 104 from the exhaust manifold 122. The first EGR system 130 may be referred to as a short route (SR) EGR system as the path taken by exhaust gas back to the intake manifold 104 is shorter than the path taken by exhaust gas through the second EGR system 132.

The second EGR system 132 controls circulation of exhaust gas from downstream of the PF 126 to upstream of the turbocharger compressor 112. In this manner, the second EGR system 132 provides exhaust gas back to the turbocharger compressor 112 to be compressed with fresh air flowing through the first throttle valve 110.

The second EGR system 132 includes a second EGR cooler/cooler bypass 138 and a second EGR valve 140. Exhaust gas flows through the second EGR system 132 to the second EGR cooler/cooler bypass 138. While not specifically recited, the second EGR system 132 also includes connecting devices (e.g., pipes) that connect the components of the second EGR system 132 together. The second EGR cooler/cooler bypass 138 includes an EGR cooler and a cooler bypass (not shown).

The EGR cooler cools exhaust gas flowing through the EGR cooler. The cooler bypass allows exhaust gas to bypass the EGR cooler. Opening of the second EGR valve 140 is regulated to control the flow of the exhaust gas back to upstream of the turbocharger compressor 112. The second EGR system 132 may be referred to as a long route (LR) EGR system as the path taken by exhaust gas back to upstream of the turbocharger compressor 112 is longer than the path taken by exhaust gas through the first EGR system 130.

Figure 1B:
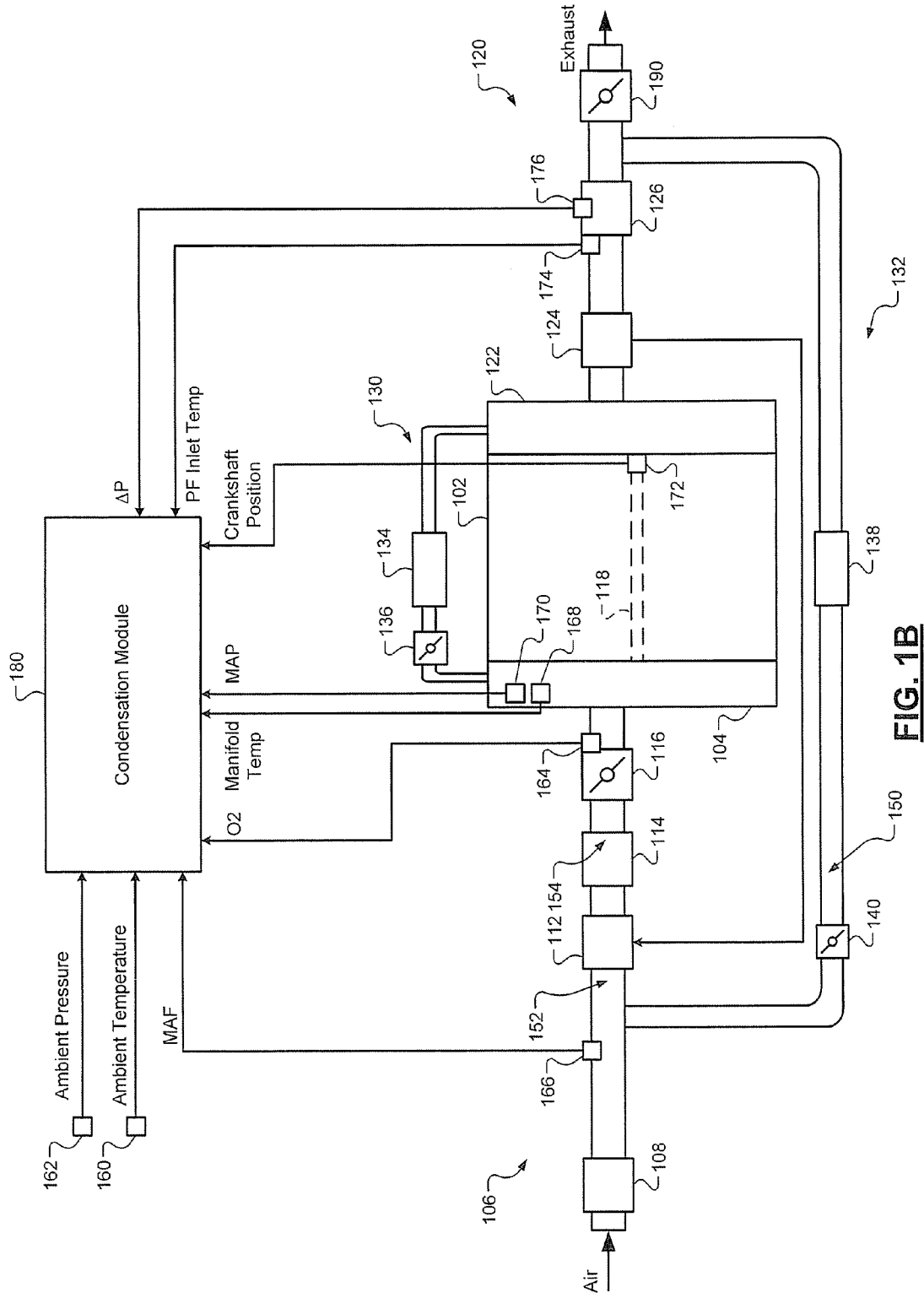

In some implementations, the first throttle valve 110 may be omitted. For example only, the first throttle valve 110 is shown as being omitted in the exemplary embodiment of FIG. 1B. In such implementations, a back-pressure valve 190 may be implemented downstream of the second EGR system 132 to restrict the flow of exhaust exiting the exhaust system 120 and increase the pressure upstream of the back pressure valve 190.

Cooling of various (relatively) warm gas(ses) throughout the engine system 100 may cause condensation at various locations or areas in the engine system 100. In the exemplary embodiment of FIG. 1A, condensation may potentially be found at three locations: a first potential condensation location 150, a second potential condensation location 152, and a third potential condensation location 154. Condensation may cause corrosion and erosion of various components of the engine system 100 that are contacted by condensation.

The first potential condensation location 150 includes locations between the second EGR cooler/cooler bypass 138 and the second EGR valve 140. Cooling of exhaust gas passing through the EGR cooler of the second EGR cooler/cooler bypass 138 may lower the temperature of the exhaust gas to below the dew point of the exhaust gas. The lowering of the temperature to or below the dew point may cause condensation which may be carried to the first potential condensation location 150.

The second potential condensation location 152 includes locations between the turbocharger compressor 112 and where the second EGR system 132 connects to the intake system 106. Fresh air being drawn through the first throttle valve 110 mixes with (relatively) warm exhaust gas from the second EGR valve 140. The temperature of the fresh air/exhaust gas mixture may be less than the dew point of the mixture. Accordingly, condensation may be found at locations between the turbocharger compressor 112 and where the second EGR system 132 connects to the intake system 106.

The third potential condensation location includes locations within the aftercooler 114 and, more specifically, near an outlet of the aftercooler 114. The aftercooler 114 may cool the gas (e.g., air or air/exhaust gas mixture) to temperatures that are less than the dew point of the gas. Accordingly, condensation may be found at locations within the aftercooler 114 and near the outlet.

One or more sensors may be implemented throughout the engine system 100 to measure operating parameters. For example only, the engine system 100 may include an ambient air temperature sensor 160, an ambient pressure sensor 162, an oxygen (i.e., lambda) sensor 164, a mass airflow (MAF) sensor 166, a manifold temperature sensor 168, and a manifold absolute pressure (MAP) sensor 170.

The ambient air temperature sensor 160 measures the temperature of ambient air and generates an ambient air temperature signal accordingly. In some implementations, intake air temperature (IAT) may be used as an indicator of the ambient air temperature. The ambient pressure sensor 162 measures pressure of the ambient (i.e., atmospheric) air and generates an ambient pressure signal accordingly. The oxygen sensor 164 measures the oxygen content of the gas flowing through the second throttle valve 116 and generates an O2 signal accordingly. The MAF sensor 166 measures mass flowrate of air through the first throttle valve 110 and generates a MAF signal accordingly.

The manifold temperature sensor 168 measures temperature within the intake manifold 104 and generates a manifold temp signal accordingly. The MAP sensor 170 measures absolute pressure within the intake manifold 104 and generates the MAP signal accordingly. In some implementations, engine vacuum may be measured, where engine vacuum is the difference between the MAP and the ambient air pressure.

The engine system 100 may also include a crankshaft position sensor 172, a PF inlet temperature sensor 174, and a pressure difference sensor 176. The crankshaft position sensor 172 monitors the position of the crankshaft 118 and outputs a crankshaft position signal accordingly. The crankshaft position signal may be used to determine the rotational speed of the engine 102 (i.e., engine speed). The PF inlet temperature sensor 174 measures the temperature of exhaust gas near an inlet of the PF 126 and generates a PF inlet temp signal accordingly. The pressure difference sensor 176 measures the difference in pressure across the PF 126 and generates a pressure difference (ΔP) signal accordingly. In some implementations, the operating parameters that would be measured by a sensor may instead be estimated or provided by another suitable source.

A condensation module 180 according to the present disclosure estimates the relative humidity of the gas (e.g., air or air/exhaust gas mixture) at the potential condensation locations 150-154. The condensation module 180 determines whether condensation is likely present at a given location based on a comparison of the relative humidity at the location with a predetermined relative humidity. The predetermined relative humidity corresponds to a relative humidity above which condensation will likely be present at the location.

Figure 2:
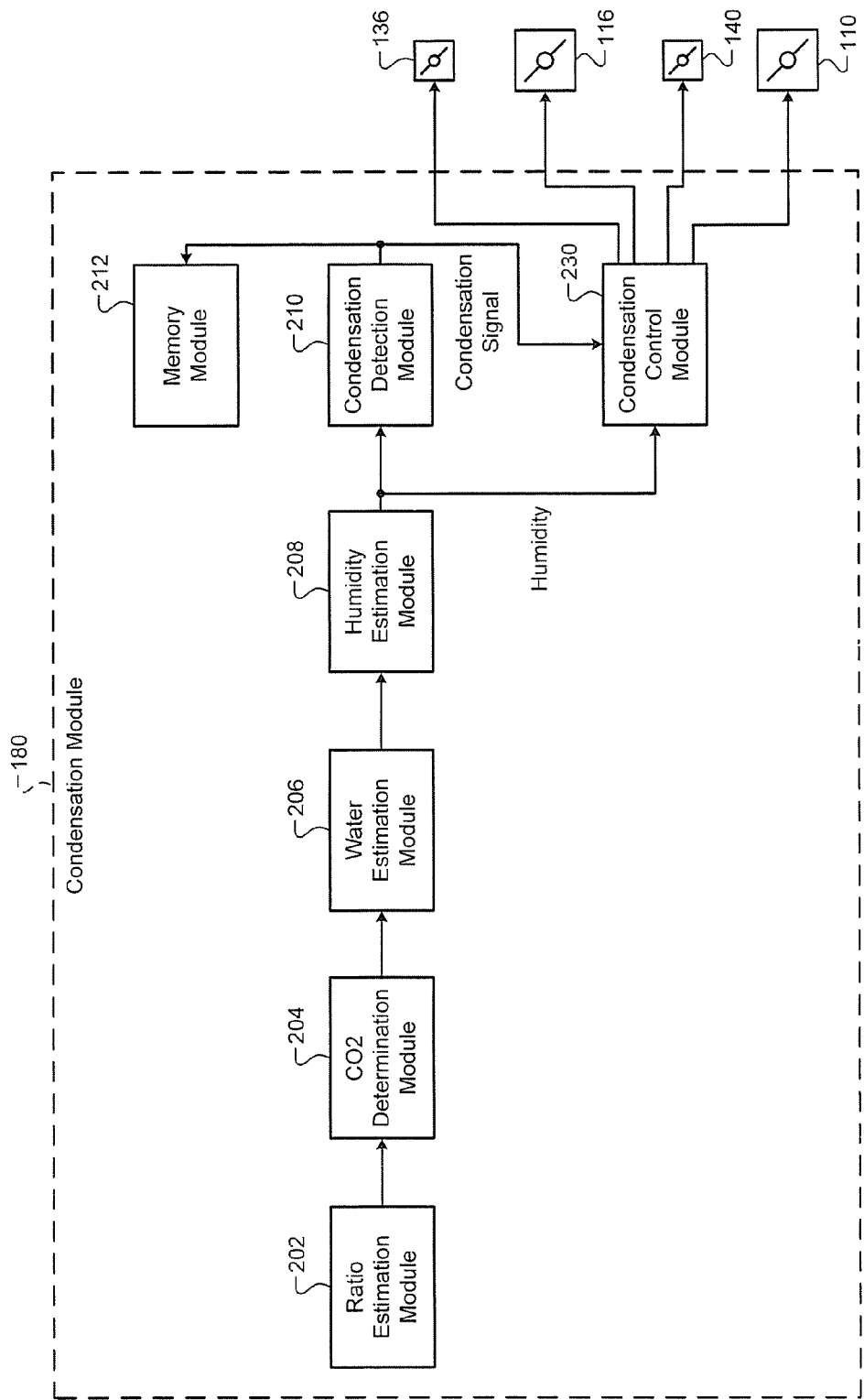
FIG. 2 is a functional block diagram of an exemplary condensation module according to the principles of the present disclosure.

Referring now to FIG. 2, a functional block diagram of an exemplary implementation of the condensation module 180 is presented. The condensation module 180 includes a ratio estimation module 202, a carbon dioxide (CO2) determination module 204, a water estimation module 206, a humidity estimation module 208. The condensation module 180 also includes a condensation detection module 210 and a condensation control module 230.

The ratio estimation module 202 estimates a molar ratio (MR) of oxygen (MR O2), a molar ratio of exhaust gas (MR EGR), and a molar ratio of exhaust gas attributable to exhaust gas from the second EGR system 132 (MR EGR LR). Use of LR is indicative of the second (i.e., long route) EGR system 132, and use of SR is indicative of the first (i.e., short route) EGR system 130.

Figure 3:
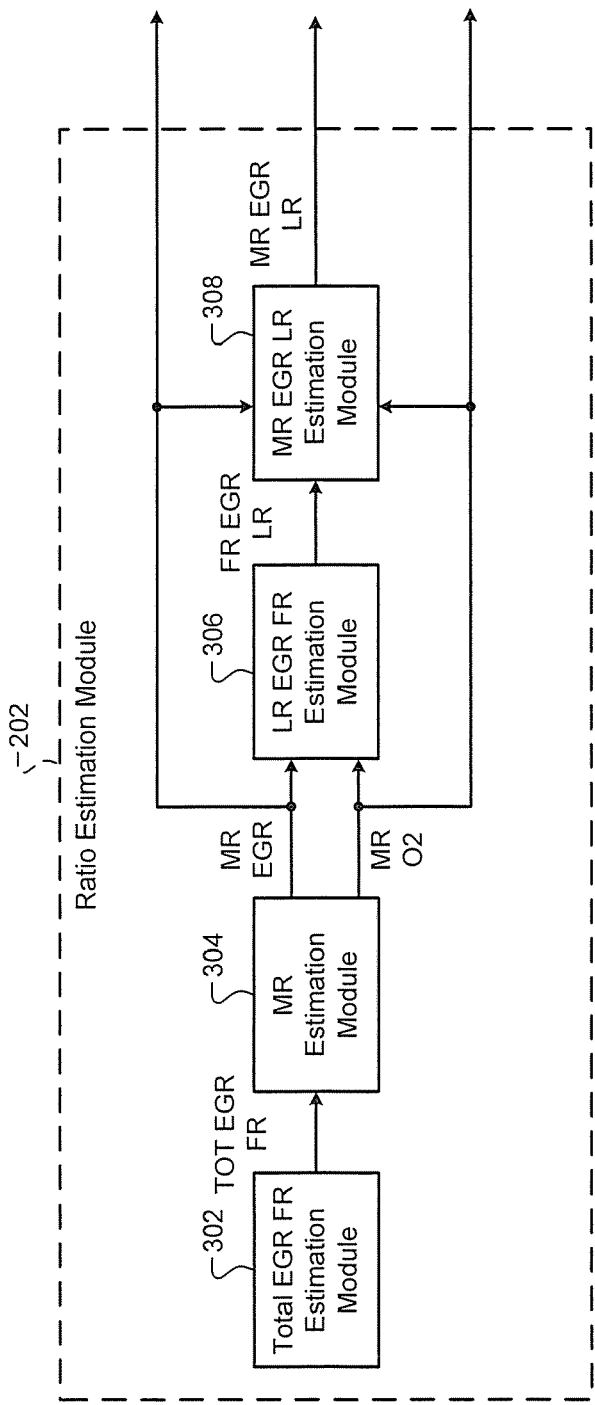
FIG. 3 is a functional block diagram of an exemplary ratio estimation module according to the principles of the present disclosure.

FIG. 3 is a functional block diagram of an exemplary implementation of the ratio estimation module 202. As shown in FIG. 3, the ratio estimation module 202 includes a total EGR flowrate (FR) estimation module 302, a MR estimation module 304, a long route (LR) EGR FR estimation module 306, and a MR EGR LR estimation module 308.

The total EGR FR estimation module 302 estimates a total flowrate of exhaust gas provided to the engine 102 (TOT EGR FR). The total EGR FR estimation module 302 estimates the total EGR flowrate based on the MAF and a total flowrate of gas into the engine 102 (W IN). For example only, the total EGR FR estimation module 302 may estimate the total EGR flowrate using the equation:

$$TOTEGRFR = \frac{WIN - MAF}{WIN},  \quad (1)$$

where: TOT EGR FR is the total EGR flowrate (kg/s); W IN is the total flowrate into the engine 102 (kg/s); and MAF is the MAF (kg/s). The total flowrate into the engine 102 (i.e., W IN) may be estimated using the equation:

$$WIN = \eta * \frac{P}{R*T} * V * \frac{N}{120},  \quad (2)$$

where: η is the volumetric efficiency of the engine 102 (0-1); P is the pressure within the intake manifold 104 (Pa) (e.g., the MAP); R is the gas constant (J/Kg/K); T is the manifold temperature (K); V is the displacement of the engine 102 (cubic meters); and N is engine speed (rpm). The volumetric efficiency of the engine 102 (i.e. η), may be estimated using the equation:

$$\eta = \sqrt{\frac{T}{TRef}} * f(P, N),  \quad (3)$$

where T Ref is a reference intake manifold temperature and f denotes use of a function.

The MR estimation module 304 estimates the molar ratio of exhaust gas and the molar ratio of oxygen. The chemical balance equation for complete combustion of a mixture of air, hydrocarbon fuel, and exhaust gas may be represented as:

$$CH_n + MRO2[O_2 + x*N_2 + y*CO_2 + z*H_2O] +$$

$$MREGR[a*CO_2 + c*H_2O + e*O_2 + h*N_2] \rightarrow$$

$$a*CO_2 + c*H_2O + e*O_2 + h*N_2,  \quad (4)$$

where: N is Nitrogen (N2 includes other inert compounds); C is Carbon; H is Hydrogen; and O is Oxygen. Coefficients a, c, e, and h may be determined by reducing the chemical balance equation (4) above once the molar ratios of oxygen and exhaust gas have been determined. For example only, the coefficients a, c, e, and h may be determined using the equations:

$$a = \frac{1 + MRO2 * y}{1 - MREGR},  \quad (5)$$

$$c = \frac{\left(\frac{n}{2}\right) + MRO2 * z}{1 - MREGR},  \quad (6)$$

$$e = \frac{MRO2 - 1 - \frac{n}{4}}{1 - MREGR}, \text{ and}  \quad (7)$$

$$h = \frac{MRO2 * x}{1 - MREGR}.  \quad (8)$$

where x is the molar ratio of N2 to O2 in air, y is the molar ratio of CO2 to O2 in air, and n is the molar ratio of H to C in the fuel injected. x, y, and n may be predetermined values and may be approximately equal to 3.7, 0.00174, and 1.87, respectively. z may be obtained using the equation:

$$z = \frac{(1 + x + y) * [H2O]Air}{1 - [H2O]Air},  \quad (9)$$

where [H2O]Air is the fraction (e.g., molar or volumetric) of water in the ambient air. The fraction of water in the air may be determined using an ambient RH sensor, the ambient pressure, and the ambient temperature.

The MR estimation module 304 estimates the molar ratio of oxygen based on the gravimetric ratio of the air/fuel mixture provided to the engine 102. For example only, the MR estimation module 304 may estimate the molar ratio of oxygen (i.e., MR O2) using the equation:

$$MRO2 = \frac{GR * MCH}{(MO_2 + x * MN_2 + y * MCO_2 + z * MH_2O)}, \quad (10)$$

where: GR is the gravimetric ratio of the air/fuel mixture; $MO_2$ is the molar mass of oxygen (kg/mol); $MN_2$ is the molar mass of nitrogen (kg/mol); $MCO_2$ is the molar mass of carbon dioxide (kg/mol); $MH_2O$ is the molar mass of water (kg/mol); and MCH is the molar mass of the fuel (kg/mol).

The MR estimation module 304 may estimate the molar ratio of exhaust gas based on the total EGR flowrate (e.g., see equation (1)) and the molar ratio of oxygen (e.g., see equation (10)). For example only, the MR estimation module 304 may estimate the molar ratio of exhaust gas (i.e., MR EGR) using the equation:

$$\frac{(1 - TOTEGRFR) *}{\left[(1 + MRO2 * y) * MCO_2 + \left(\frac{n}{2} + MRO2 * z\right) * MH_2O\right]}{TOTEGRFR * MRO2 *} + \quad (11)$$
$$(MO_2 + x * MN_2 + y * MCO_2 + z * MH_2O)$$
$$\frac{(1 - TOTEGRFR) * \left[\left(MRO2 - 1 - \frac{n}{4}\right) *\right.}{\left.\frac{MO_2 + MRO2 * x * MN_2}{OTEGRFR * MRO2 * (MO_2 + x *}\right.} + 1$$
$$MN_2 + y * MCO_2 + z * MH_2O)$$

where MR EGR is equal to the multiplicative inverse of the result of equation (11). In other words, MR EGR=result of equation $(11)^{-1}$.

The LR EGR FR estimation module 306 estimates a flowrate of the exhaust gas provided by the second (i.e., long route) EGR system 132 (FR EGR LR). For example only, the LR EGR FR estimation module 306 may estimate the flowrate of the exhaust gas provided by the second EGR system 132 (i.e., FR EGR LR) using the equation:

$$FREGRLR = \frac{WLREGR}{MAF + WLREGR}, \quad (12)$$

where W LR EGR is the total flowrate of exhaust gas through the second EGR valve 140 (kg/s). The total flowrate of exhaust gas through the second EGR valve 140 (i.e., W LR EGR) may be estimated using the equation:

$$W\ LR\ EGR = A\ EGR\ 2 * \frac{P\ Amb}{\sqrt{T\ EGR\ C\ 2}} * f_T\left(\frac{P\ Precomp}{P\ Amb}\right), \quad (13)$$

where: A EGR 2 is the effective area (square meters) of the second EGR valve 140 and the second EGR cooler/cooler bypass 138; P Amb is the ambient pressure (Pa); T EGR C 2 is the temperature near the outlet of the second EGR cooler/cooler bypass 138 (K); P Precomp is the pressure upstream of the turbocharger compressor 112 (Pa); and $f_T$ indicates use of the standard orifice flow function (e.g., see equations (15)-(16)). The pressure upstream of the turbocharger compressor 112 (i.e., P Precomp) may be determined using the equation:

$$P\ Precomp = f_{IT}\left(\frac{MAF * \sqrt{T\ Amb}}{A\ In}, P\ Amb\right), \quad (14)$$

where: $f_{IT}$ indicates use of the inverted throttle function; A In is the effective area of the air filter 108 and the first throttle valve 110; T is the ambient temperature (K); and P Amb is the ambient pressure (Pa). In some implementations, the inverted throttle function may be derived iteratively offline based on the standard orifice isentropic flow model. The standard orifice flow function through a given orifice may be described by the equations:

$$f_T\left(\frac{P2}{P1}\right) = \sqrt{\left(\frac{2*\gamma}{R*(\gamma-1)}\right) * \left[\left(\frac{P2}{P1}\right)^{\frac{2}{\gamma}} - \left(\frac{P2}{P1}\right)^{\frac{\gamma+1}{\gamma}}\right]}, \quad (15)$$

where $\left(\frac{P2}{P1}\right) > PR\ Crit;$ and $$f_T\left(\frac{P2}{P1}\right) = \sqrt{\left(\frac{\gamma}{R}\right) * \left(\frac{2}{\gamma+1}\right)^{\left(\frac{\gamma+1}{\gamma-1}\right)}}, \text{ where } \left(\frac{P2}{P1}\right) \le PR\ Crit \quad (16)$$

where: P1 is a first pressure upstream of the orifice; P2 is a second pressure downstream of the orifice; PR Crit is a critical pressure ratio; $\gamma$ is the ratio of specific heats; and R is the gas constant. The critical pressure ratio (i.e., PR Crit) may be determined using the equation:

$$PR\ Crit = \left(\frac{2}{\gamma+1}\right)^{\left(\frac{-\gamma}{\gamma-1}\right)}. \quad (17)$$

The total amount of exhaust gas circulated back to the intake manifold 104 is provided by the combination of the first EGR system 130 and the second EGR system 132. The total EGR flowrate (i.e., TOT EGR FR) can therefore be expressed as a sum of the flowrate of the exhaust gas provided by the second EGR system 132 (i.e., FR EGR LR) and a flowrate of exhaust gas provided by the first (i.e., short route) EGR system 130. Written as an equation:

$$TOT\ EGR\ FR = SR\ EGR\ FR + LR\ EGR\ FR \quad (18)$$

where SR EGR FR is the flowrate of exhaust gas provided by the first (i.e., short route) EGR system 130.

Similar to how the molar ratio of exhaust gas may be estimated based on the total EGR flowrate (e.g., see equation (11)), the molar ratio of the exhaust gas provided by the second EGR system 132 (MR EGR LR) can be estimated from the flowrate of the exhaust gas provided by the second EGR system 132 (i.e., FR EGR LR). For example only, the MR EGR LR estimation module 308 may estimate the molar ratio of the exhaust gas provided by the second EGR system 132 (i.e., MR EGR LR) using the equation:

$$MR\ EGR\ LR = \left(\frac{FR\ EGR\ LR}{1 - FR\ EGR\ LR}\right) * \quad (19)$$
$$\left[\frac{MR\ O2 * (MO_2 + x * MN_2 + y * MCO_2 + z * MH_2O)}{(a * MCO_2 + c * MH_2O + e * MO_2 + h * MN_2)}\right].$$

The MR EGR, the MR O2, and the MR EGR LR are provided to the CO2 estimation module as shown in FIG. 2. Referring back to FIG. 2, the CO2 determination module 204 determines the fraction (e.g., molar or volumetric fraction) of carbon dioxide in the gas at each of the potential condensation locations 150-154. For the first potential condensation location 150 (i.e., between the second EGR cooler/cooler bypass 138 and the second EGR valve 140), the carbon dioxide fraction may be determined using the equation:

$$CO2\ L1 = \frac{1 + MR\ O2*y}{MR\ O2(1 + x + y + z) + \left(\frac{n}{4}\right)}, \quad (20)$$

where CO2 L1 is the fraction of carbon dioxide at the first potential condensation location 150.

For the second potential condensation location 152 (i.e., between the turbocharger compressor 112 and where the second EGR system 132 connects to the intake system 106), the carbon dioxide fraction may be determined using the equation:

$$CO2\ L2 = \frac{MR\ O2*y + MR\ EGR\ LR*a}{MR\ O2(1 + x + y + z) +\\ MR\ EGR\ LR*(a + c + e + h)}, \quad (21)$$

where CO2 L2 is the fraction of carbon dioxide at the second potential condensation location 152. For the third potential condensation location 154 (i.e., near the outlet of the aftercooler 114), the carbon dioxide fraction will be equal to the carbon dioxide fraction at the second potential condensation location 152 (i.e., CO2 L2) assuming steady-state flow.

The water estimation module 206 estimates the fraction (e.g., molar or volumetric fraction) of water in the gas at each of the potential condensation locations 150-154. At a given location, the fraction of water may be estimated using the equation:

$$[H2O]IN = [H2O]\ Air + \left[\frac{\frac{n}{2}*\left(1 - \frac{[H2O]\ Air}{2}\right)*([CO2]IN - [CO2]\ Air)}{\left(1 - \frac{n}{4}*[CO2]\ Air\right)}\right], \quad (22)$$

where [H2O]IN is the fraction of water in the gas at the given location, [H2O]Air is the fraction of water in the air, [CO2]IN is the fraction of carbon dioxide in the gas at the location, and [CO2]Air is the fraction of carbon dioxide in the air. The fraction of carbon dioxide in the gas (i.e., [CO2]Air) may be estimated using the equation:

$$[CO2]\ Air = \frac{y}{1 + x + y + z}. \quad (23)$$

The humidity estimation module 208 estimates relative humidity of the gas at each of the potential condensation locations 150-154 based on the fraction of water in the gas at each of the potential condensation locations 150-154. The humidity estimation module 208 may estimate the relative humidity (RH) at a given location (i.e., RH IN) using the equation:

$$RH\ IN = [H2O]IN * \frac{P\ IN}{P\ Sat}, \quad (25)$$

where RH IN is the relative humidity at the location (0-1), P IN is the pressure at the given location (Pa), and P Sat is the saturated vapor pressure at the given location (Pa). The saturated vapor pressure at the given location may be estimated using the equation:

$$PSat = 10^{\left(2.78571 + \frac{7.502*(T-T0)}{237.3+T-T0}\right)}, \quad (26)$$

where T is the temperature of the gas at the given location and T0 is a predetermined conversion temperature (e.g., 273.15 K).

In some implementations, the temperature and/or pressure may be measured at each of the potential condensation locations 150-154. In other implementations, the temperature and/or pressure may be estimated. For example only, the pressure at the first potential condensation location 150 may be assumed to be equal to the ambient air pressure.

The temperature at the first potential condensation location 150 may be estimated based on the inlet temperature of the PF 126. For example only, the temperature at the first potential condensation location 150 (i.e., TPCL1) may be estimated using the equation:

$$TPCL1 = TPFOut - \epsilon_{EGRC}(TPFOut - TCoolant), \quad (27)$$

where, TPFOut is the temperature at the outlet of the PF 126 (K), $\epsilon_{EGRC}$ is the effectiveness of the second EGR cooler/cooler bypass 138 (0-1), and TCoolant is the temperature of the coolant flowing through the EGR cooler (K).

The pressure at the second potential condensation location 152 (i.e., P Precomp) may be estimated using equation (14), as described above. The temperature at the second potential condensation location 152 (i.e., T Precomp) may be estimated using the equation:

$$T\ Precomp = \frac{MAF*T\ Amb + W\ LR\ EGR*T\ EGR\ C\ 2}{MAF + W\ LR\ EGR}, \quad (28)$$

where W LR EGR is the total flowrate of exhaust gas through the second EGR valve 140 (kg/s), T Amb is the ambient air temperature (K), and T EGR C2 is the temperature near an outlet of the EGR cooler of the second EGR cooler/cooler bypass 138 (K).

The temperature at the third potential condensation location 154 (i.e., TPCL3) may be estimated using the equation:

$$TPCL3 = TCompOut - \epsilon_{AC}*(TCompOut - TACCoolant), \quad (29)$$

where TPCL3 is the temperature at the third potential condensation location 154 (K), TCompOut is the temperature near the outlet of the turbocharger compressor 112 (K), $\epsilon_{AC}$ is the effectiveness of the aftercooler 114 (0-1), and TACCoolant is the temperature of the coolant flowing through the aftercooler 114 (K). The TCompOut may be estimated using the equation:

$$TCompOut = TPCL2 * \left\{1 + \frac{1}{\eta Comp} * \left[\left(\frac{PAc}{PPrecomp}\right)^{\frac{\gamma-1}{\gamma}} - 1\right]\right\}, \quad (30)$$

where PAc is the pressure of the aftercooler 114 (Pa), γ is the ratio of specific heats, and is the isentropic efficiency of the turbocharger compressor 112. The isentropic efficiency of the turbocharger compressor 112 (i.e., ηComp) may be estimated from the map of the efficiency of the turbocharger compressor 112 function ($f_{CE}$):

$$\eta Comp = f_{CE}\left(\frac{PAc}{PPrecomp}, \frac{WComp * \sqrt{TPCL2}}{PPrecomp}\right). \quad (31)$$

The pressure at the third potential condensation location 154 (i.e., PAc) may be estimated using the differential equation:

$$\frac{dPAc}{dt} = \frac{\gamma * R}{VAc} * (WComp * TPCL3 - WTV2 * TAcOutTR), \quad (32)$$

where VAc is the volume of the aftercooler 114 (cubic meters), WComp is the flowrate through the turbocharger compressor 112 (kg/s), WTV2 is the flowrate through the second throttle valve 116 (kg/s) and TAcOutTR is the transient temperature near the outlet of the aftercooler 114. At wide open throttle, the PAc may be set equal to the MAP. The TAcOutTR includes the effects of transport delays through the turbocharger compressor 112 and may be calculated from the perfect gas law.

The condensation detection module 210 detects whether condensation is likely present at each of the potential condensation locations 150-154 based on a comparison of a predetermined relative humidity and the relative humidity at the respective potential condensation locations 150-154. The predetermined relative humidity corresponds to a relative humidity above which condensation will likely be present at a given location. The predetermined relative humidity may be calibratable and may be set to, for example, approximately 0.7. In some implementations, the predetermined relative humidity may vary from location to location. The condensation detection module 210 determines that condensation is present at a given location when the relative humidity at the location is greater than the predetermined relative humidity.

The condensation detection module 210 generates a condensation signal that indicates whether condensation is likely present. The condensation signal may carry data for each of the potential condensation locations 150-154 or a condensation signal may be generated for each of the potential condensation locations 150-154.

The condensation signal may be used to set a flag or code in a predetermined location in a memory module 212. A module or system that takes remedial action when condensation is detected may periodically check the memory module 212 or receive the condensation signal to determine whether condensation has been detected and take the remedial action when condensation has been detected. For example only, the condensation control module 230 may take remedial action when the condensation signal indicates that condensation is likely present.

Figure 4A:
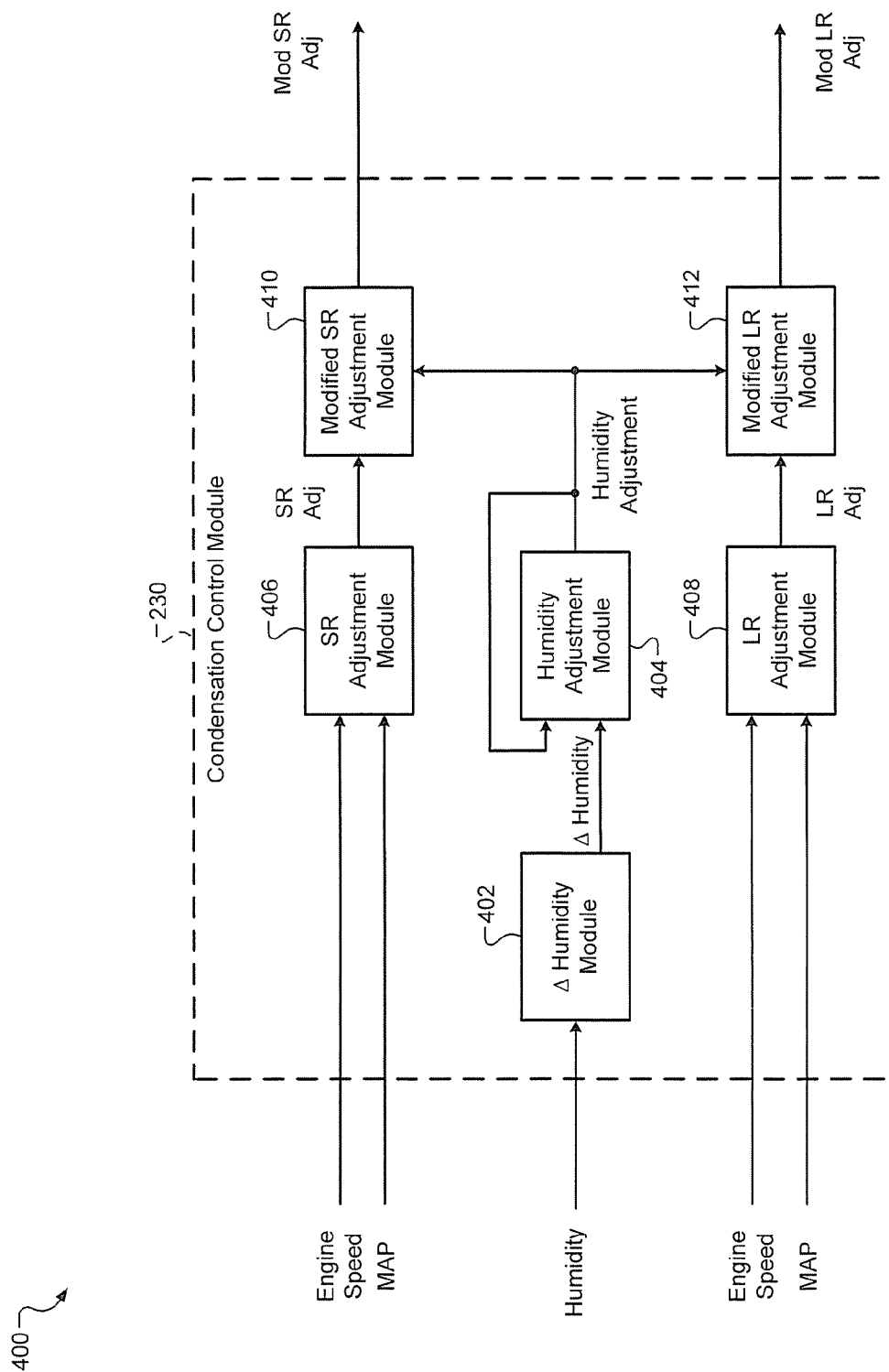
FIGS. 4A-4B are functional block diagrams of an exemplary condensation control system according to the principles of the present disclosure.
Figure 4B:
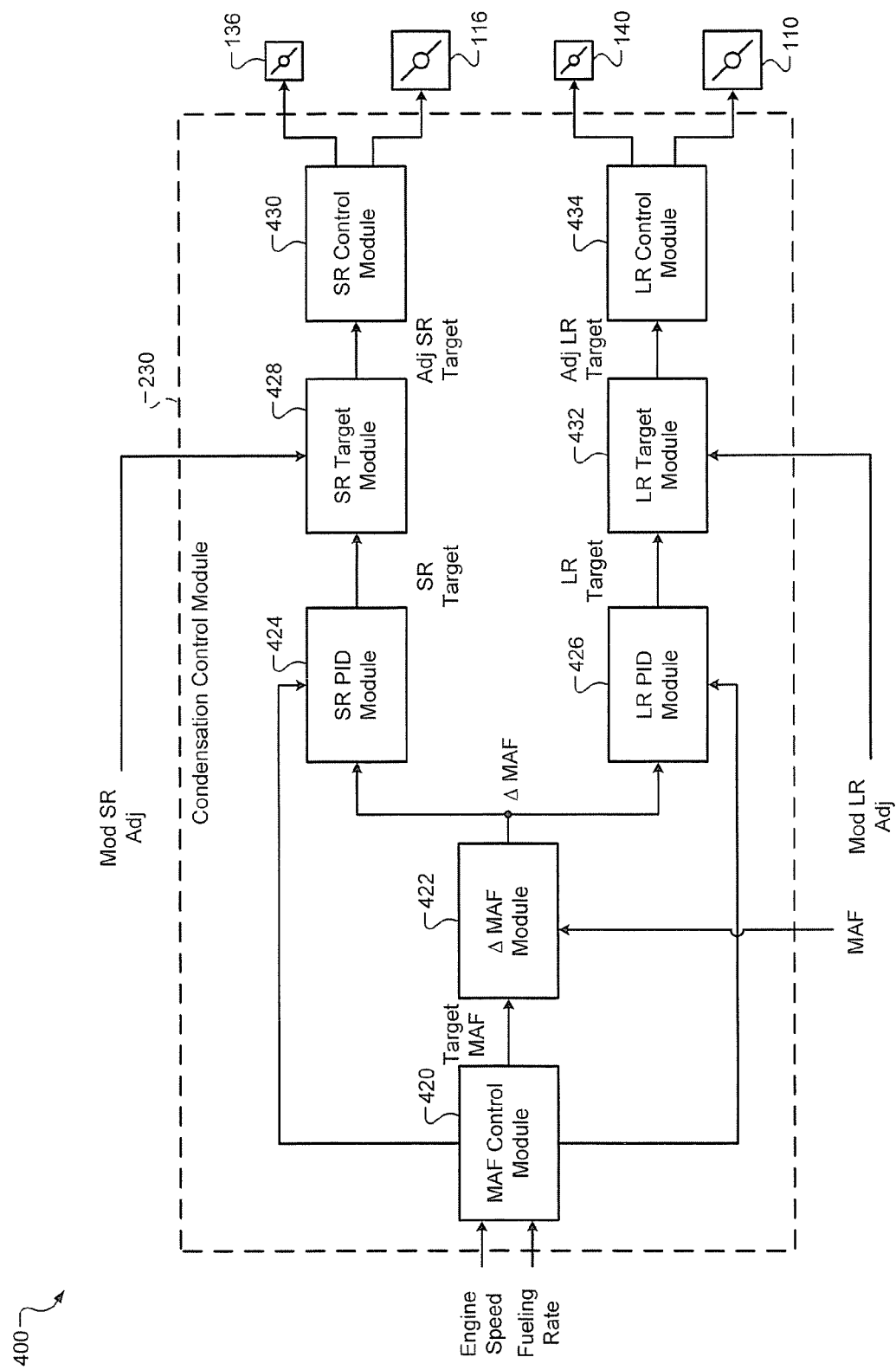

Referring now to FIGS. 4A-4B, a functional block diagram of an exemplary implementation of a condensation control system 400 including the condensation control module 230 is presented. As shown in FIG. 4A, the condensation control module 230 includes a delta (Δ) humidity module 402, a humidity adjustment module 404, an SR adjustment module 406, and an LR adjustment module 408. The condensation control module 230 also includes a modified SR adjustment module 410 and a modified LR adjustment module 412.

The delta humidity module 402 determines a delta humidity (Δ humidity) based on differences between the relative humidities of the potential condensation locations 150-154 and the predetermined relative humidity. For example only, for a given potential condensation location, the delta humidity module 402 may determine the delta humidity for the location according to the predetermined relative humidity subtracted from the relative humidity at the location. In this manner, the delta humidity for the location will be positive when condensation is likely occurring at the location.

The humidity adjustment module 404 determines a humidity adjustment based on the delta humidity. For example only, the humidity adjustment module 404 may determine the humidity adjustment to be zero when the delta humidity is non-positive. The humidity adjustment module 404 may determine the humidity adjustment to be a sum of the delta humidity and a previous humidity adjustment when the delta humidity is positive. For example only, the previous humidity adjustment may be a last humidity adjustment output by the humidity adjustment module 404 before receiving the delta humidity.

The SR (i.e., short route) and LR (i.e., long route) adjustment modules 406 and 408 determine a SR adjustment (SR Adj) and a LR adjustment (LR Adj), respectively. The SR and LR adjustment modules 406 and 408 determine the SR and LR adjustments based on the engine speed and an engine load. In some implementations, the engine load may be determined based on the MAP, such as the ratio of the MAP to a maximum MAP of the engine 102.

Modified SR and LR adjustment modules 410 and 412 determine a modified SR adjustment (Mod SR Adj) and a modified LR adjustment (Mod LR Adj) based on the SR and LR adjustments, respectively, and the humidity adjustment. In other words, the modified SR and LR adjustment modules 410 and 412 selectively modify the SR and LR adjustments, respectively, based on the humidity adjustment.

For example only, the modified SR adjustment module 410 may determine the modified SR adjustment as the humidity adjustment subtracted from the SR adjustment. In other words, the modified SR adjustment module 410 may modify the SR adjustment by decreasing the SR adjustment by the humidity adjustment.

The modified LR adjustment module 412 may determine the modified SR adjustment as a sum of the humidity adjustment and the LR adjustment. In other words, the modified LR adjustment module 412 may modify the LR adjustment by increasing the LR adjustment by the humidity adjustment. The modified SR and LR adjustment modules 410 and 412 feed the modified SR and LR adjustments forward as discussed with respect to FIG. 4B.

As shown in FIG. 4B, the condensation control module 230 also includes a MAF control module 420, a delta (Δ) MAF module 422, and SR and LR proportional-integral-derivative (PID) modules 424 and 426. The condensation control module 230 also includes a SR target module 428, a SR control module 430, a LR target module 432, and a LR control module 434.

The MAF control module 420 generates a target for the MAF (i.e., a MAF target) and outputs the target to the delta MAF module 422. The MAF control module 420 may determine the MAF target based on the engine speed and the flowrate that fuel is being provided to the cylinders of the engine 102 for combustion (e.g., kg/s).

The delta MAF module 422 determines a delta MAF (Δ MAF) based on a difference between the MAF target and the MAF measured by the MAF sensor 166. The delta MAF module 422 provides the delta MAF to the SR and LR PID modules 424 and 426. The SR and LR PID modules 424 and 426 output SR and LR targets, respectively, based on the delta MAF. More specifically, the SR and LR PID modules 424 and 426 generate the SR and LR targets in an attempt to adjust the delta MAF toward zero and achieve the target MAF.

The MAF control module 420 selectively enables or disables the SR and LR PID modules 424 and 426 based on the condensation signal. For example only, the MAF control module 420 may enable the SR and LR PID modules 424 and 426 when the condensation signal indicates that condensation is present. The MAF control module 420 may also initialize the SR and LR PID modules 424 and 426 when condensation is present.

The MAF control module 420 may additionally or alternatively enable or disable the SR and LR PID modules 424 and 426 based on the engine load. For example only, the MAF control module 420 may disable the SR PID module 424 when the engine load is less than a predetermined load. The predetermined load may be determined from a lookup table, for example, based on engine speed.

The SR target module 428 receives the modified SR adjustment from the modified SR adjustment module 410 and the SR target from the SR PID module 424. The SR target module 428 determines an adjusted SR target based on the modified SR adjustment and the SR target. For example only, the SR target module 428 may determine the adjusted SR target based on a sum of the modified SR adjustment and the SR target. In this manner, the SR target module 428 may act as a summer of the modified SR adjustment and the SR target.

The SR control module 430 determines targets for the first EGR valve 136 and the second throttle valve 116 based on the adjusted SR target. The SR control module 430 controls opening of the first EGR valve 136 and the second throttle valve 116 based on the respective targets. In this manner, the SR control module 430 controls the flowrate of exhaust gas provided by the first (i.e., short route) EGR system 130 and the flowrate of gas through the second throttle valve 116.

Similarly, the LR target module 432 receives the modified LR adjustment from the modified LR adjustment module 412 and the LR target from the LR PID module 426. The LR target module 432 determines an adjusted LR target based on the modified LR adjustment and the LR target. For example only, the LR target module 432 may determine the adjusted LR target based on a sum of the modified LR adjustment and the LR target. In this manner, the LR target module 432 may act as a summer of the modified LR adjustment and the LR target.

The LR control module 434 determines targets for the second EGR valve 140 and the first throttle valve 110 based on the adjusted LR target. The LR control module 434 controls opening of the second EGR valve 140 and the first throttle valve 110 based on the respective targets. In this manner, the LR control module 434 controls the flowrate of exhaust gas provided by the second (i.e., long route) EGR system 132 and the flowrate of gas through the first throttle valve 110. In implementations where the first throttle valve 110 is omitted, the LR control module 434 may determine a target for the back-pressure valve 190 based on the adjusted LR target and control opening of the back-pressure valve 190 based on that target.

The decrease in the modified SR adjustment coupled with the increase in the modified LR adjustment when condensation is present ensures that the total flowrate of exhaust gas back to the intake system 106 remains the same. The decrease in the adjusted SR target and the corresponding increase in the adjusted LR target eliminates the detected condensation in the engine system 100.

Figure 5:
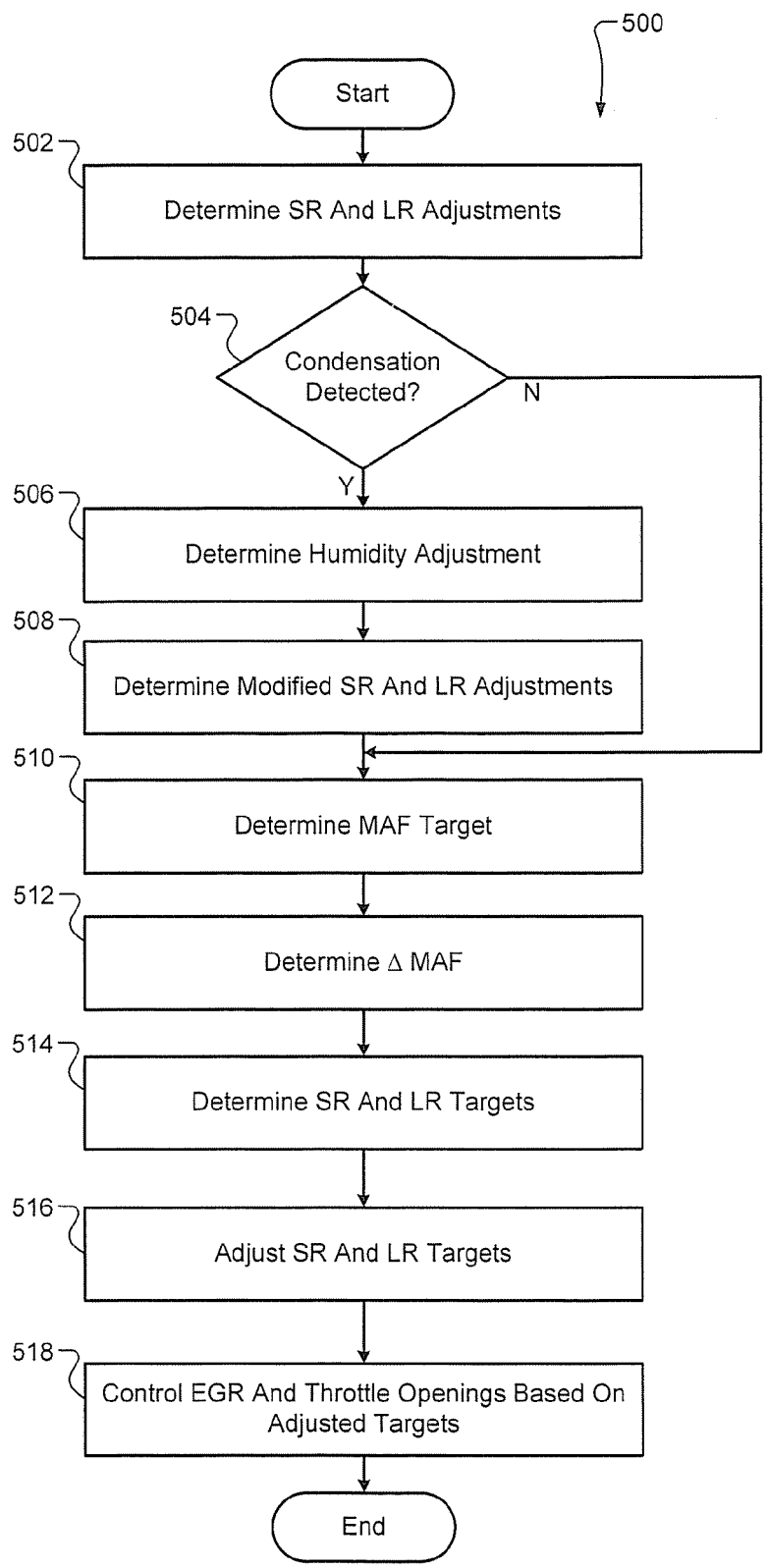
FIG. 5 is a flowchart depicting exemplary steps performed by a method according to the principles of the present disclosure.

Referring now to FIG. 5, a flowchart depicting exemplary steps performed by a method 500 is presented. The method 500 begins in step 502 where the method 500 determines the SR and LR adjustments. The method 500 may determine the SR and LR adjustments based on, for example, the engine speed and the engine load. The method 500 determines whether condensation has been detected in step 504. If true, the method 500 continues to step 506; if false, the method 500 transfers to step 510.

In step 506, the method 500 determines the humidity adjustment. The method 500 may determine the humidity adjustment based on a sum of the previous humidity adjustment and a difference between the relative humidity and the predetermined relative humidity. In some implementations, the method 500 may continue to step 506 when condensation has not been detected in step 504 and set the humidity adjustment equal to zero in step 506. The method determines the modified SR and LR adjustments in step 508. For example only, the method 500 determines the modified SR adjustment based on the SR adjustment less the humidity adjustment and the modified LR adjustment based on the sum of the LR adjustment and the humidity adjustment.

In step 510, the method determines the MAF target. The method 500 may determine the MAF target based on, for example, the engine speed and the fueling rate. The method 500 determines the delta MAF in step 512 based on the difference between the MAF target and the MAF measured by the MAF sensor 166. The method 500 determines the SR and LR targets based on the delta MAF in step 514.

The method 500 adjusts the SR and LR targets in step 516. The method 500 may adjust the SR and LR targets based on the modified SR and LR adjustments. For example only, the method 500 may sum the SR target and the modified SR adjustment and may sum the LR target and the modified LR adjustment. In this manner, the SR and LR targets are adjusted when condensation is detected. The method 500 controls opening of the first and second throttle valves 110 and 116 and the first and second EGR valves 136 and 140 based on the adjusted SR and LR targets in step 518. More specifically, the method 500 controls opening of the first EGR valve 136 and the second throttle valve 116 based on the adjusted SR target and controls opening of the second EGR valve 140 and the first throttle valve 110 based on the adjusted LR target.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A condensation control system for a vehicle, comprising:
   a short route (SR) target module that controls a first opening target for opening of a first exhaust gas recirculation (EGR) valve and a first throttle valve based on a SR target and a SR adjustment;
   a long-route (LR) target module that controls a second opening target for opening of a second EGR valve and a second valve based on a LR target and a LR adjustment; and a humidity adjustment module that adjusts the SR and LR adjustments based on a humidity adjustment when condensation is detected in a system that provides a gas to an engine for combustion and that determines the humidity adjustment based on a difference between a humidity within the system and a predetermined humidity.

2. The condensation control system of claim 1 further comprising:
an SR control module that controls opening of the first EGR valve and the first throttle valve based on the first opening target; and
an LR control module that controls opening of the second EGR valve and the second valve based on the second opening target.

3. The condensation control system of claim 2 wherein the first EGR valve controls exhaust gas flow from an exhaust manifold to an intake manifold, and
wherein the second EGR valve controls exhaust gas flow from downstream of a particulate filter to upstream of an inlet of a turbocharger compressor.

4. The condensation control system of claim 1 wherein the humidity adjustment module determines the humidity adjustment based on a sum of the difference and a previous humidity adjustment when the condensation is detected.

5. The condensation control system of claim 1 further comprising:
an SR adjustment module that determines the SR adjustment based on a second SR adjustment and the humidity adjustment; and
an LR adjustment module that determines the LR adjustment based on a second LR adjustment and the humidity adjustment.

6. The condensation control system of claim 5 wherein the SR adjustment module determines the SR adjustment based on the second SR adjustment less the humidity adjustment, and
wherein the LR adjustment module determines the LR adjustment based on a sum of the second LR adjustment and the humidity adjustment.

7. The condensation control system of claim 5 wherein the second SR and LR adjustments are determined based on a speed of the engine and an engine load.

8. The condensation control system of claim 1 wherein the humidity adjustment module decreases the first opening target and increases the second opening target based on the humidity adjustment.

9. The condensation control system of claim 1 wherein the humidity adjustment module decreases the SR adjustment and increases the LR adjustment based on the humidity adjustment.

10. The condensation control system of claim 1 wherein the second valve includes one of a second throttle valve and a back-pressure valve.

11. A condensation control method for a vehicle, comprising:
controlling a first opening target for opening of a first exhaust gas recirculation (EGR) valve and a first throttle valve based on a short route (SR) target and a SR adjustment;
controlling a second opening target for opening of a second EGR valve and a second valve based on a long route (LR) target and a LR adjustment;
adjusting the SR and LR adjustments based on a humidity adjustment when condensation is detected in a system that provides a gas to an engine for combustion; and
determining the humidity adjustment based on a difference between a humidity within the system and a predetermined humidity.

12. The condensation control method of claim 11 further comprising:
controlling opening of the first EGR valve and the first throttle valve based on the first opening target; and
controlling opening of the second EGR valve and the second valve based on the second opening target.

13. The condensation control method of claim 12 wherein the first EGR valve controls exhaust gas flow from an exhaust manifold to an intake manifold, and
wherein the second EGR valve controls exhaust gas flow from downstream of a particulate filter to upstream of an inlet of a turbocharger compressor.

14. The condensation control method of claim 11 further comprising determining the humidity adjustment based on a sum of the difference and a previous humidity adjustment when the condensation is detected.

15. The condensation control method of claim 11 further comprising:
determining the SR adjustment based on a second SR adjustment and the humidity adjustment; and
determining the LR adjustment based on a second LR adjustment and the humidity adjustment.

16. The condensation control method of claim 15 further comprising:
determining the SR adjustment based on the second SR adjustment less the humidity adjustment; and
determining the LR adjustment based on a sum of the second LR adjustment and the humidity adjustment.

17. The condensation control method of claim 15 further comprising determining the second SR and LR adjustments further based on a speed of the engine and an engine load.

18. The condensation control method of claim 11 further comprising decreasing the first opening target and increasing the second opening target based on the humidity adjustment.

19. The condensation control method of claim 11 further comprising decreasing the SR adjustment and increasing the LR adjustment based on the humidity adjustment.

20. The condensation control method of claim 11 wherein the second valve includes one of a second throttle valve and a back-pressure valve.

* * * * *